Jan. 14, 1941. W. C. WARE 2,228,617
REVERSE GEARING
Filed July 31, 1939

Inventor:
Walter C. Ware

Patented Jan. 14, 1941

2,228,617

UNITED STATES PATENT OFFICE 2,228,617

REVERSE GEARING

Walter C. Ware, Taunton, Mass., assignor to Paragon Gear Works Inc., Taunton, Mass., a corporation of Massachusetts Application July 31, 1939, Serial No. 287,469

8 Claims. (Cl. 74—298)

This invention relates to reverse gearing especially adapted, although not necessarily restricted, to marine propulsion, for connecting a propeller shaft with an engine shaft to rotate in the same direction and also in the opposite direction as the engine shaft.

The invention is particularly concerned with planetary reverse gearing having engine shaft and propeller shaft gears with planetary gearing connecting the shaft gears for reverse drive of the propeller shaft gear when the carrier for the planetary gearing is held stationary, and clutch mechanism for clutching the planetary gear carrier with one of the shaft gears for locking all gears together for forward drive.

In reverse gearing of the type set forth, wherein the drive between the engine and the propeller shafts in forward drive is through the gears, the gears at times may be noisy or chatter, due to the necessary clearance between the gear teeth. This is especially true with internal combustion engines having a light engine shaft that twists under the successive explosions and also in engines having a too light fly wheel. The reverse gearing is essentially a fairly heavy fly wheel that tends to maintain a constant rate of rotation. In engines where the shafts twist or the fly wheel is too light, the end of the shaft carrying the shaft gear of the gearing is periodically accelerated and decelerated so that it oscillates with respect to the gears of the reverse gearing. Hence the gears are oscillated by the amount of the necessary clearance between the gear teeth and chatter is produced, the chatter being objectionable not only because of the noise but also because of the hammer blow stresses set up in the parts.

It has been proposed heretofore to clutch the casing of the reverse gear to both the engine and the shaft gears in the forward drive condition of the gearing by the use of sets of thin clutch discs or plates associated with both shaft gears and the casing, the gear carrier being located between the clutches and slidable axially of the enclosing casing for setting the clutches, the clutch plates having a spline connection with the engine shaft. While this construction can eliminate chatter for a time, chatter soon develops because the spline connection between the clutch plates and the engine shaft has to be made sufficiently loose so that the plates can slide axially. Thus backlash occurs between the clutch plates and the engine shaft, and the pounding of the engine shaft on the clutch plates soon batters down the spline connection and increases the loose fit so that chatter is no longer prevented.

It has been proposed to eliminate this trouble by the replacing the forward clutch by a cone clutch, the movable element of which had a spline connection with the engine shaft and a conical face engageable with a corresponding face of the planetary gear carrier casing, the cone being split radially so that when engaged with the carrier casing it would contract about the engine shaft and eliminate the clearance between the splines and thereby prevent chatter at the splines. This construction is not entirely satisfactory since the cone is not surely disengageable with its cooperating internal cone when the clutch engaging pressure thereon is released due to its grip on the engine shaft. If the engagement with the engine shaft is not tight when the clutch is engaged, chatter is not prevented. Furthermore, a cone clutch wears rapidly and a highly magnified component of the wear is in the direction of the axis of the gearing, which is the operative direction of movement of the cone. Thus the clutch operating mechanism has to be frequently adjusted to take up the wear of the cone, which is obviously undesirable. Moreover, it is difficult to provide a cone with a sufficiently large frictional area to transmit enough torque to prevent chatter of the reverse gears in the limited space available in a reverse gearing.

It is an object of the present invention to provide a reverse gearing with a chatter preventing or gear dampening clutch for the gears, which clutch is of such nature that it is effective for the purpose, is practically immune from wear between it and the engine shaft, and has a minimum component of wear in a clutch setting direction so that adjustments of the clutch operating mechanism do not have to be made frequently.

A further object of the invention is the provision of a reverse gearing having a gear dampening clutch provided with a large area of engagement with the engine shaft and broad areaed radial clutch faces composed of highly wear resistant material.

An additional object of the invention is the provision of a reverse gearing having a gear dampening clutch consisting of a single radial clutch plate interposed between and adapted to frictionally engage the gear carrier and a casing wall, the plate having a long hub provided with a splined slidable connection with the engine shaft.

A further object is generally to improve the construction and operation of reverse gearing.

Figure 1:
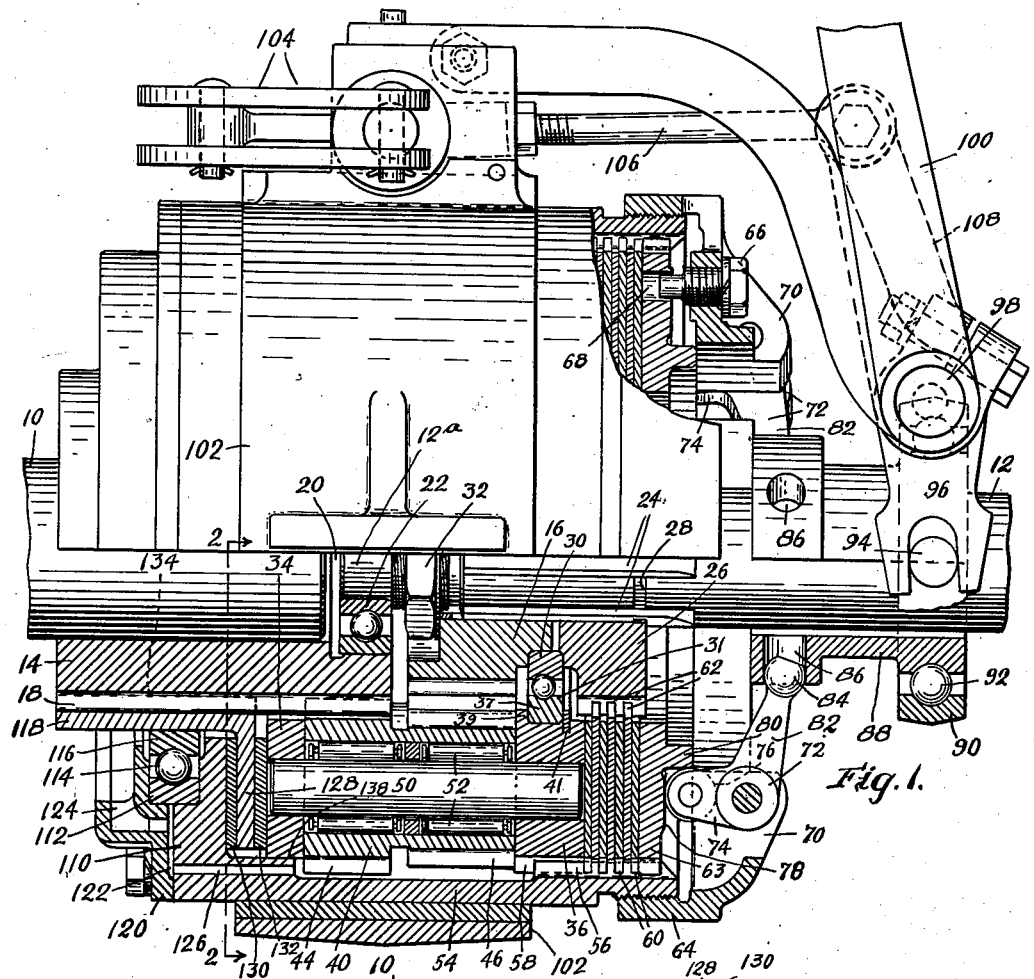
Fig. 1 is an elevation partly in vertical section of a reverse gearing embodying the present invention.

The reverse gearing embodying the present invention is adapted to connect the aligned engine and propeller shafts 10 and 12, respectively. The gearing includes the engine shaft spur gear 14 and the propeller shaft spur gear 16. The engine shaft gear is fixed to the engine shaft for conjoint rotation therewith in a suitable manner and consists of a long hub provided with external gear teeth 18 that extend the entire length of the hub. The hub extends rearwardly of the end of the engine shaft and is provided with an internal recess 20 in which an anti-friction bearing 22 is located and which rotatably supports the forward end 12a of the propeller shaft.

The propeller shaft is provided with a plurality of external splines 24 meshing with splines of the gear 16. A clutch plate carrier 26 is located on the propeller shaft rearwardly of the propeller shaft gear and has a spline connection with the propeller shaft and is seated against an annular flange or ledge 28 of the propeller shaft.

The inner race 30 of a planetary gear carrier antifriction bearing 31 is located between and is seated upon the hubs of the propeller shaft gear and the clutch plate carrier and all are clamped together and against the flange 28 of the propeller shaft by a nut 32 screw-threaded on the end part of the propeller shaft.

Figure 2:
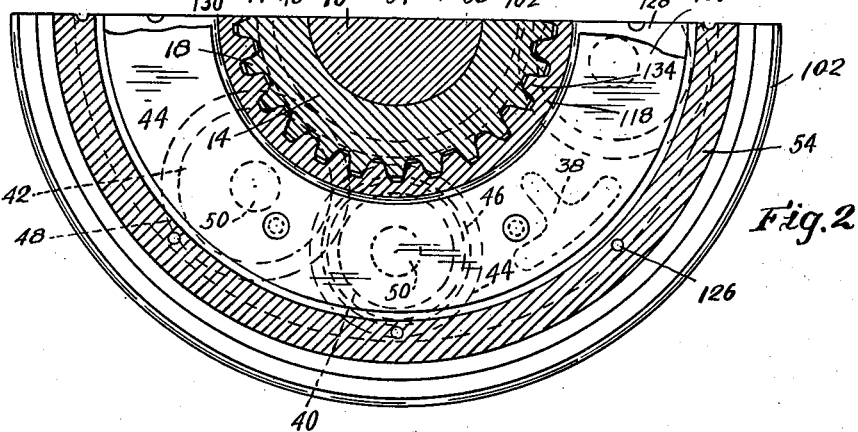
Fig. 2 is a sectional detail taken along line 2—2 of the gear of Fig. 1.

The reverse gearing also includes a planetary gear carrier composed of two axially spaced radial front and rear end plates 34 and 36, respectively, rigidly connected by ribs 38, Fig. 2, integral with the walls and located between them. The rear wall 36 overlies the anti-friction bearing 31 and the outer race 37 of said bearing is clamped between an annular instanding shoulder 39 of the wall and a removable retainer ring 41 so that the casing at the rear end thereof is supported rotatably by the bearing and is held against axial movement.

A plurality of sets of planetary pinion gears are carried by said carrier. Each set comprises a long pinion gear 40 and a short or reversing pinion gear 42. The long pinion gear 40 overlies both shaft gears and is provided at one end with a set of spur gear teeth 44 meshing with the engine shaft gear teeth and at the other end with a set of spur gear teeth 46 of reduced pitch diameter confronting but out of mesh with the propeller shaft gear teeth and in mesh with the gear teeth 48 of the reversing gear 42, which latter gear meshes with the propeller gear. The gears 40 and 42 are mounted on pins 50 located in the side walls of the pinion carrier and traversing the space therebetween. Antifriction elements in the form of rollers 52 are located internally of the pinion gears and bear both on the gears and on the pins 50.

The pinion gear carrier is located within a cylindrical drum or enclosing casing 54 which at the rear end thereof has internally directed splines 56 which are engaged with splines 58 of the rear wall 36 of the pinion carrier so that the pinion carrier and casing are connected for conjoint rotation while permitting axial displacement of the casing with respect to the carrier. The splined part of the casing extends rearwardly beyond the end wall of the carrier and is provided with a set of clutch plates 60 which are alternately disposed with respect to a similar set of clutch plates 62 having a splined connection with the clutch plate carrier 26. Thus when the clutch plates are frictionally engaged the casing, the carrier and the propeller shaft are locked together for conjoint rotation and hence the pinion gears of the carrier are held against rotation and the two shafts rotate conjointly in the same direction for forward drive.

The clutch operating mechanism includes a clutch actuating plate 63 having a splined connection with the splines 56 of the casing and disposed at the rear of the sets of clutch plates. A ring 64 is adjustably screw-threaded externally on the rear end part of the casing and is adapted to be locked in any adjusted position thereof by a locking screw 66 which is screw-threaded in the ring and is adapted to be located in any one of a plurality of holes 68 formed in the clutch actuating plate. Said ring is provided with a plurality of sets of ears 70 between and to which are pivoted bell crank levers 72 having forwardly extended arms 74 carrying rollers 76 that roll in engagement with the radial rear face 78 of the clutch actuating plate and are held in a clutch set position against a rearwardly projecting shoulder 80 of said plate.

The bell crank levers have inwardly directed arms 82 terminated in spherical end parts 84 located loosely in radial cylindrical holes 86 of a clutch actuating hub 88 which is slidable axially on the propeller shaft rearwardly to set the clutch and forwardly to release the clutch. The hub is moved axially by a ring 90 which encircles and has an anti-friction bearing 92 with the hub and is provided with oppositely directed pins 94 located between the furcations of bifurcated arms 96 fixed to an operating cross shaft 98 suitably journalled and carrying an operating lever 100 movable forwardly and rearwardly to control the clutch of the gearing.

The casing 54 is held stationary to secure reverse drive by brake mechanism including a brake band 102 which encircles the casing and is adapted to be contracted into frictional holding engagement with the casing by a suitable mechanism 104 operated by a pull rod 106 connected with an upstanding arm 108 fixed to the cross shaft 98.

The arrangement is such that in the foremost position of the operating lever 100 the clutch is set to secure forward drive and the brake band is released. In the rearmost position of the operating lever the brake mechanism is set to secure reverse drive and the clutch is released. In an intermediate position of the lever both brake and clutch mechanisms are in unoperated positions and the gearing is neutral.

The casing 54 at the forward end thereof is provided with an integral radially inwardly directed front wall 110 which is forwardly of the front wall of the gear carrier. The front face of said wall 110 is annularly recessed and receives the outer race 112 of an anti-friction bearing 114. The inner race 116 of said bearing is slidable on a hub 118 carried by the engine gear 14, thereby rotatably supporting the front end of the casing. A front cover and oil receiving plate 120 is fixed to the casing over the front wall thereof and is provided with a channel 122 between it and the front wall that communicates with an outer channel 124 and with the interior of the casing through a passage 126 in the casing wall to maintain oil within the gearing.

The hub 118 at the inner end thereof is provided integrally with a laterally outstanding radial flange or plate 128 which is located between the radial casing wall 110 and the radial front wall 34 of the gear carrier and is faced on both sides with discs 130 and 132 of friction material suitably fixed to the plate. Specifically the discs are a molded product of asbestos fibres with a synthetic resin as a phenol-formaldehyde resin as a binder, this material having a high coefficient friction and being extremely wear resistant.

The hub 118 with the plate 128 and the discs 130, 132 constitute the gear dampening means of the present invention and serve to clutch the gearing with the engine shaft when the gearing is set for forward drive. This clutching engagement is effected by a rearward axial movement of the gearing casing during the clutch setting operation and serves to press the dampening clutch plate 128 between the forward wall 34 of the gear carrier and the front wall 110 of the casing so that both the casing and the gear carrier are independently directly clutched to the engine gear.

Due to the fact that the clutch engaging faces are radial the axial movement of the casing to compensate for the wear is no greater than the actual amount of wear and hence the clutch actuating mechanism does not need frequent adjustment to compensate for the wear.

The hub 118 is long in axial extent in its engagement with the engine gear 14, the length of engagement being greater than the diameter of the pitch line of engagement and has a plurality of splines 134 which interfit with the interdental spaces of and engage the teeth or splines 18 of the gear sufficiently closely so that there is no appreciable amount of backlash, although the hub can slide freely on the gear. Due to the large number of splines and the long length of the splines the unit pressure on the engaging surfaces is exceptionally small so that the surfaces can resist the pounding that they receive due to oscillations of the engine shaft without becoming battered or worn to enlarge the clearance. Hence the engine shaft and the gears of the reverse gearing are held against chatter. Due to the long hub the clutch plate 128 is securely supported radially against canting and hence there is no drag between it and the cooperating casing and carrier walls in the unset condition of the clutch.

The outer periphery of the front wall 34 of the gear carrier is seated loosely on and supported concentrically with the driving and driven shafts by the inner annular ledge 138 of the casing.

I claim:

1. Reversing mechanism comprising the combination of aligned driving and driven spur gears, a casing surrounding said gears, pinion gears connected with said casing meshing with said spur gears, brake mechanism for holding said casing stationary to secure reverse drive, and clutch mechanism connecting said casing and one of said spur gears to secure forward drive, said clutch mechanism comprising a single radial plate having an axially long axially slidable driving connection with one of said spur gears, said casing having parts providing radial clutch faces on opposite sides of said radial clutch plate, and means for moving one of said parts axially to press said clutch plate between said parts.

2. Reverse gearing comprising the combination of aligned driving and driven spur gears, a pinion gear carrier having pinion gears meshing with certain of said spur gears, a casing enclosing said carrier and having a driving connection therewith admitting of relative axial movement between said carrier and casing, said casing having a radial front wall and said carrier having a radial front wall, a radial clutch disc interposed between said walls and adapted to be engaged thereby, said clutch disc having a hub provided with an axially long and axially slidable driving connection with said driving gear, other clutch mechanism for connecting said casing with said driven gear, clutch operating mechanism for imparting relative axial movement between said gear carrier and casing for setting both clutch mechanisms, and means for holding said casing stationary to secure reverse drive of the gearing.

3. In a reverse gearing as set forth in claim 2, said hub being seated on and slidable axially of the driving gear, the hub and the gear having a plurality of long intermeshing splines which provide a large area of driving contact between the hub and the gear.

4. In a reverse gearing as set forth in claim 2, said radial clutch disc having on its opposite faces clutch faces composed of highly wear resistant molded bodies of asbestos fibre and a synthetic resin, which bodies are engaged by the confronting faces of the walls of said casing and carrier.

5. In a reverse gearing, the combination of aligned driving and driven spur gears, a pinion gear carrier having pinion gears meshing with certain of said spur gears, a casing enclosing said carrier having a driving connection therewith admitting of relative axial movement between said casing and carrier, said casing having a radial front wall, said gear carrier having a radial front wall, a radial clutch plate located between said walls and adapted to be engaged thereby, said clutch plate having an integral hub carried by and having a splined connection with said driving gear by which it is movable axially of while maintaining its driving connection with said gear, said hub being extended through the front wall of said casing and said casing having a bearing on said hub permitting relative axial movement between said hub and casing wall, and other clutch mechanism connecting said casing and driven gear.

6. In a reverse gearing as in claim 5, said bearing comprising an anti-friction bearing having an outer race fixed to said casing wall and an inner race slidable on said hub.

7. Reversing mechanism having the combination of aligned driving and driven shafts, gearing connecting said shafts including driving and driven spur gears on said driving and driven shafts, a gear carrier surrounding said shaft gears and at times rotatable relatively thereto, pinion gears carried by said carrier meshing with certain of said shaft gears, a casing surrounding said carrier having a driving connection therewith constraining said casing and carrier for conjoint rotation and permitting relative axial movement therebetween, clutch mechanism connecting said casing and driven shaft for forward drive comprising clutch plates alternately connected with said casing and driven shaft and having an axial length of engagement with said driven shaft not substantially in excess of the thickness of said plates, and gear-dampening clutch mechanism connecting said driving shaft and casing and carrier including, a clutch plate engageable with said casing and carrier having a driving connection with said driving shaft that is materially axially longer than the thickness of said clutch plate.

8. Reversing mechanism comprising the combination of aligned driving and driven spur gears, a pinion gear carrier, pinion gears carried by said carrier meshing with certain of said spur gears, a casing enclosing said carrier and having a driving connection therewith which constrains said casing and carrier for conjoint rotation and admits relative axial movement therebetween, means including a single clutch plate for clutching said carrier and casing to said driving gear, said clutch plate having an axially long driving connection with said driving gear, and means including a plurality of clutch plates connecting said casing and driven gear, said clutch plates having axially short driving connections with said driven gear.

WALTER C. WARE.